Nov. 3, 1942.  F. N. SCAIFE ET AL  2,300,814
INDICATING METER, PARTICULARLY FOR RADIO NAVIGATIONAL PURPOSES
Filed March 7, 1941
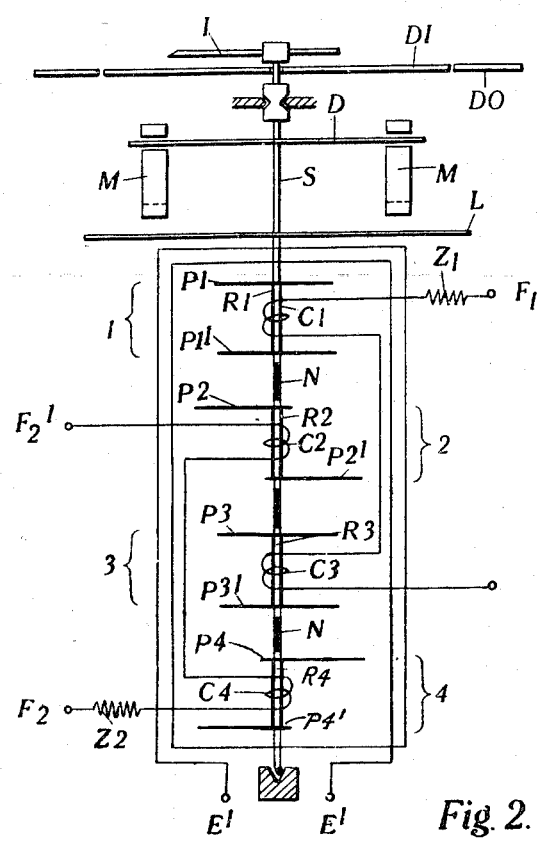
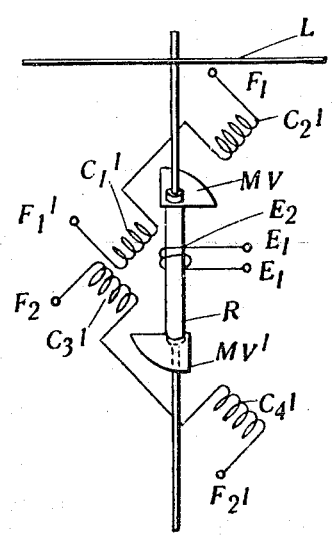
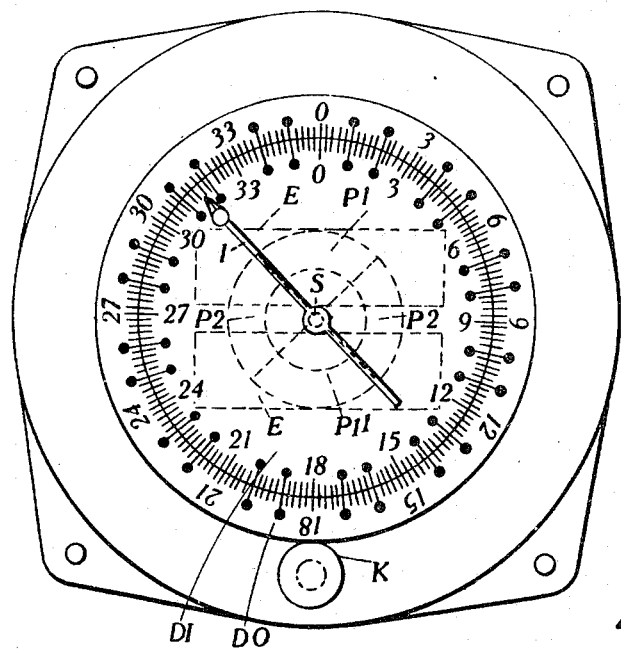
INVENTORS
C. L. Lipman
F. N. Scaife
ATTORNEY Patented Nov. 3, 1942

2,300,814

UNITED STATES PATENT OFFICE 2,300,814

INDICATING METER, PARTICULARLY FOR RADIO NAVIGATIONAL PURPOSES

Frederick Noel Scaife and Chmoul Leib Lipman, London, England, assignors to International Standard Electric Corporation, New York, N. Y.

Application March 7, 1941, Serial No. 382,208
In Great Britain January 3, 1940

1 Claim. (Cl. 171—95)

This invention relates to an electrical instrument constructed to provide the means for indicating the resultant of two or more electrical vector quantities which may be of different magnitudes and angular displacements, or for indicating the angular relationship between two vectors rotating synchronously. Instruments of this type are known and are commonly used for the purpose of synchronising running machinery, and for the measurement of commercial power factors and the angle of lead or lag in alternating current systems in all of which cases a single frequency is dealt with. The vector angle between the reference currents is usually either 90° or 120° and the magnitude of the vectors can be preadjusted to suit the operating conditions of the instrument.

In the application of such an instrument for purposes of navigational measurement the vectors to be related are, in general, produced by the amplification of weak radio signals or like means, which places a restriction on the amount of power available to work the instrument, a restriction which is not present in the case of the uses cited above. Furthermore, it is highly desirable, although not essential, that the resultant of the vectors shall be indicated on a uniformly divided scale, i. e., the indication shall be geometrically correct and not arbitrary, as in the case of most commercial power factor meters. For example, the arbitrary indication in the latter is commonly due to the fact that the design is such that magnetic coupling exists between the individual reference systems, this coupling producing a distortion of the locus (or polar diagram) of the resultant rotating magnetic field vector derived from the individual reference systems. A third restriction on the design is imposed by the fact that the vectors may be produced and separated in prior amplification circuits by modulation at different frequencies; the instrument must therefore be independent in its readings (within reasonable limits) of the frequency of each component. It is also important for navigational purposes that the indicator be very reliable in its action under all service conditions.

In order to obtain the performance described above, we propose an instrument having a freely rotating but damped moving system consisting of a pivoted shaft carrying at one end a pointer, and fitted with a number of radially spaced approximately quadrantal plates, separated by rods, co-axial with the spindle.

According to the invention in an instrument of the type described in which an exciting coil or coils and two or more coils carrying the reference currents are provided, none of which coils rotate with the moving system, the coils which are adapted to carry the reference currents are so arranged that when the instrument is in use substantially no magnetic coupling exists between them.

According to another feature of the invention the vanes are grouped in pairs to form separate magnetic systems magnetised by fixed annular coils adapted to carry reference vector currents of the same or different frequencies, these reference coils being so disposed as to be astatic to one another whereby substantially no magnetic coupling exists between them.

According to a further feature of the invention the exciting coil is formed as an annular winding around the magnetic rod and the reference or field coils are disposed at right angles to one another in order to prevent magnetic coupling between them.

In the preferred embodiment described there are eight quadrantal plates, grouped in pairs, the plates of each pair being spaced at 180° radial separation and the four groups being spaced at 90° radial separation. Each pair of plates and the portion of rod between them are made of readily permeable magnetic material the magnetic system thus formed being magnetised by a stationary concentric coil wound round the spacing rod and rigidly fixed to the frame of the instrument.

Clearly, the complete moving system comprises four magnetic systems as described above mounted co-axially on a common shaft and separated from one another by non-magnetic rods or spacers. The four magnetising coils suitably connected and carrying two reference vector currents are arranged so that their magnetic fields are relatively astatic, as will be described below, thereby reducing the magnetic coupling or crosstalk between them to a minimum.

The moving system together with the magnetising or "reference" coils is placed centrally in the field of an exciting or "search" coil (or coils). By this symmetrical disposition of the reference coils with their associated magnetic systems in the field of a common exciting coil an arrangement is produced in which the direction of the resultant magnetic field is determined solely by the individual fields due to the reference systems, i. e., there is substantially no distortion due to the results of magnetic coupling between the reference systems.

Accordingly, the scale may be marked in geometrical degrees with negligible error. This is a desirable feature, as in some applications of the instrument the scale must coincide with an adjustable outer ring or scale also marked in degrees, in all positions of the latter, in which case an arbitrary scale would be useless.

In one use of the instrument, the reference coils are energised at two different frequencies, and the exciting coil is likewise energised by a combination of the same two frequencies in varying amplitude and phase relationship. Under these conditions, the moving system will take up a position indicating the amount of each frequency component present in the exciting system and "sensible" to the phase relationship existing between the fixed and moving systems.

The currents in the reference coils energising the moving system are locally produced and the current energizing the exciting coil is produced by modulating a radio signal with these locally produced currents. In this way, a navigational bearing of the transmitting station is produced.

By suitably shaping the moving plates and by disposing the individual magnetic systems at other angles, or by having more than two exciting coils (for example three coils fixed at 120° relative to one another) it is possible to use the instrument to obtain the resultant of several vectors, all of which may have a different frequency.

According to another embodiment, an exciting or search coil is formed as an annular coil around a magnetic spindle carrying two angularly disposed vanes which co-operate with two pairs of fixed field or reference coils the axes of which are arranged at right-angles.

In the accompanying drawing:

Fig. 1 is a diagram illustrating the essential parts of an instrument according to this invention;

Fig. 2 is a front view of an instrument suitable, for example, for the navigation of an airplane;

Fig. 3 is a diagram of a modified form of instrument.

With reference to Fig. 1, the moving system comprises four separate magnetic systems, 1, 2, 3 and 4, mounted co-axially on a suitably pivoted common shaft S and separated from one another by rods or spacers N of non-magnetic material.

Each magnetic system comprises a pair of quadrantal plates P1P1'; (P2P2'; P3P3'; P4P4'); of thin soft iron mounted one near each end of a rod R1 (R2, R3 or R4 respectively) of magnetic material. The plates of each pair are spaced at 180 degrees radial separation and the consecutive magnetic systems are spaced at 90 degrees radial separation relative to one another. Thus, the axis of symmetry of the magnetic system comprising plates P1P1' is at right angles to that of the adjacent magnetic system comprising plates P2P2' as shown in plan view by dotted lines in Fig. 2. Further, the magnetic system P3R3P3' is set in space in the same direction as the system P1R1P1' and the magnetic system P4R4P4' is set in the same direction as the magnetic system P2R2P2'. It will also be noted from Fig. 2 that each group of four adjacent plates, viz. P1P1'P2P2'; P2P2'P3P3'; or P3P3'P4P4' also group P1P1'P4P4' forms a complete circle in plan view.

The four magnetic systems are energized by stationary concentric coils C1, C2, C3, C4. In the example illustrated, the coils C1 and C3 are connected in series across terminals F1F1' with or without a resistance Z1 and are supplied with a reference current having a frequency $f_1$ and similarly, the coils C2 and C4 connected to terminals F2F2' are supplied with a reference current having a frequency $f_2$.

The vector angle between the said two reference currents is 90 degrees.

The moving system described above is arranged to work in the field of an exciting coil E connected to terminals E'E'. This coil is preferably wound in two sections as shown on plan view Fig. 2 and the complete assembly is made perfectly symmetrical. The exciting coils and the magnetising coils are conveniently mounted on a frame or casting (not shown) made to receive them.

Attached to the upper end of the shaft S is an indicating pointer I extending in a plane normal to the shaft and moving over an inner fixed dial DI and an outer ring or dial DO the latter being adjustable by means of a knob K (Fig. 2) from the front of the instrument.

An eddy current magnetic brake comprising an aluminium disc D mounted on the non-magnetic portion of the shaft S and rotating between the poles of one or more permanent magnets MM is provided preferably in conjunction with a magnetic screen L, the purpose of which is to eliminate any effect of the fields of the permanent magnets upon the magnetic plates of the moving system of the instrument.

According to the invention, the magnetic fields due to the coils C1 and C3 carrying a reference current of one frequency, are relatively astatic from the point of view of interaction to the field due to coil C2 which carries a reference current of another frequency and similarly, the magnetic fields due to the coils C2 and C4 are relatively astatic to the field of the coil C3, thereby reducing to a minimum the magnetic coupling between the two reference systems.

Further, since the resultant action of the magnetic systems P1R1C1P1' and P4R4C4P4' is identical with the resultant action of the remaining magnetic systems P2R2C2P2' and P3R3C3P3' the indication of the pointer is in fact the average of two separate measurements. At the same time the working torque of the instrument is practically doubled by the said duplex action. The above features together with the symmetrical mechanical construction enable the scales to be marked in geometrical degrees with negligible error.

Fig. 2 is a front view of a dashboard type of instrument for aircraft use, suitable for reading directly the bearing of a distant radio transmitting station.

According to one application the instrument operates in conjunction with the receiver amplifier and a pair of loops rigidly fixed at right angles to each other. A signal picked up by the loops is modulated at one frequency in one loop and at a second frequency in the second loop. The two outputs together with a signal from a vertical "sense" aerial are combined, amplified, detected and the output fed to the "search" or exciting coil of the instrument.

The two reference coil circuits are each fed with one of the modulation frequencies, the fields set up being of equal strength.

Depending on the amplitudes and phases of the two modulation frequencies in the search coil, the pointer of the instrument will take up a position making the same relative angle with the reference systems as the bearing of the distant transmitter makes with the loops.

In a modification the coils of each reference system, viz. C1 and C3, may be connected in parallel thereby increasing the reliability of the instrument since a break in the circuit of one of these coils does not appreciably affect the resultant reading of the instrument.

In another modification the moving system is arranged to work in the rotating magnetic field of three exciting coils spaced at 120 degrees and carrying currents, the vector angles of which are 120 degrees.

In a further modification the moving system is arranged to work in the rotating magnetic field of four exciting coils disposed with their axes at right-angles to one another and carrying 90° vector currents.

As shown in the modification diagrammatically illustrated in Fig. 3, the exciting or "search" coil E2 may encircle a rod R of magnetisable material and two or more pairs of field or reference coils C1', C2' and C3', C4' may be arranged at right-angles to one another in different planes along the axis of the rod R. A pair of magnetic vanes MV, MV' displaced at a suitable angle co-operate one with each pair of field coils and in practice would move in narrow central slots in these coils which will be wound on flat spools. Since the pairs of field or reference coils are at right-angles to one another cross-talk or magnetic coupling between them is reduced to a minimum. By this symmetrical disposition of the reference coils and by profiling of the moving vanes an arrangement is produced in which the geometric position taken up by the moving system will correspond very closely with the position in space of the resultant magnetic field when both the exciting coil and the reference coils are energised, the former for example at two different frequencies and the latter by a combination of the same two frequencies in varying amplitude and phase relationship.

What is claimed is:

An indicating instrument for radio navigation purposes comprising a pivoted shaft, indicating means controlled thereby, four magnetic systems disposed on said shaft, each system comprising a rod of magnetic material forming part of said shaft, and an approximately quadrantal plate of magnetic material secured to each end of said rod spaced 180° radially from each other, the respective magnetic systems being disposed with a progressive radial displacement of 90°, a section of non-magnetic material in said shaft between the respective magnetic systems, a stationary coil coaxially disposed about said shaft between the plates of each magnetic system, a stationary exciting coil comprising two coil members disposed on opposite sides of said shaft so as to enclose substantially said magnetic systems, a circuit connecting the alternate coils of said magnetic systems in series, the connections being such that the magnetic field of one serially connected pair is relatively astatic to that of the other serially connected pair in order to reduce the magnetic coupling between the magnetic systems, the arrangement being such that when a signal from a first antenna is applied to one of the serially connected coil pairs, and a signal from a second antenna angularly displaced from the first antenna is connected to the second pair of coils, with the exciting coil suitably energized, an indication of the direction of the signals will be given by the indicating means controlled by said shaft.

FREDERICK NOEL SCAIFE.
CHMOUL LEIB LIPMAN.